United States Patent Office 3,415,360
Patented Dec. 10, 1968

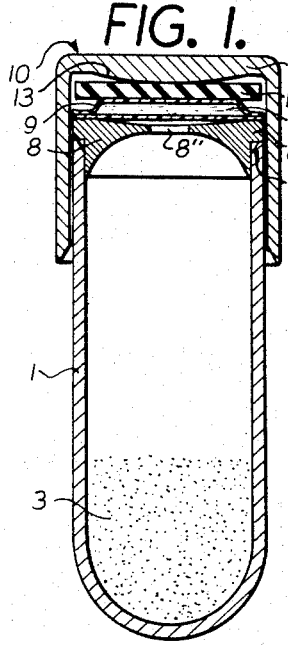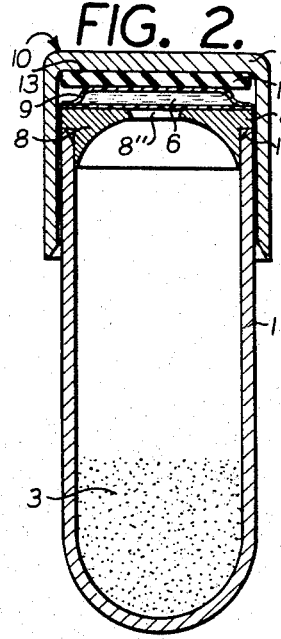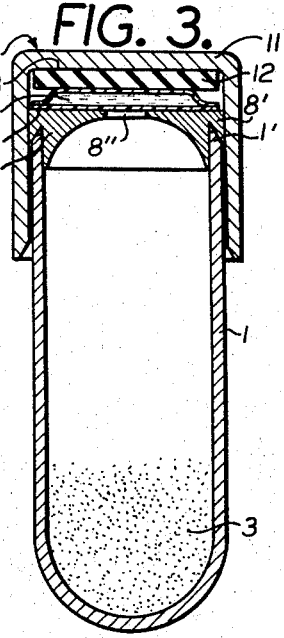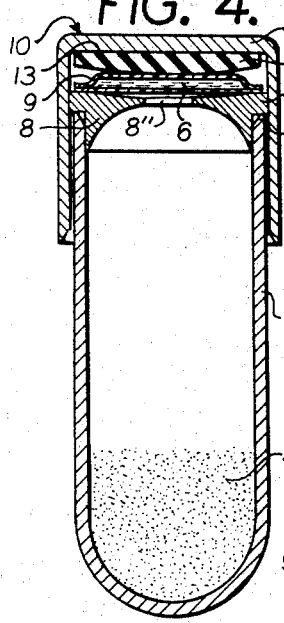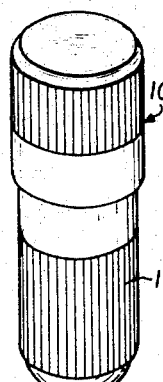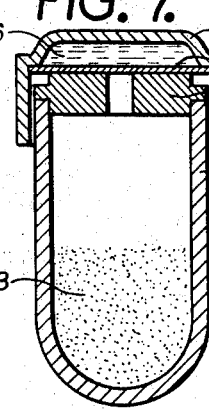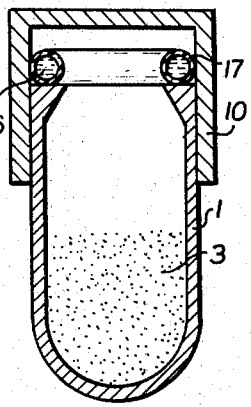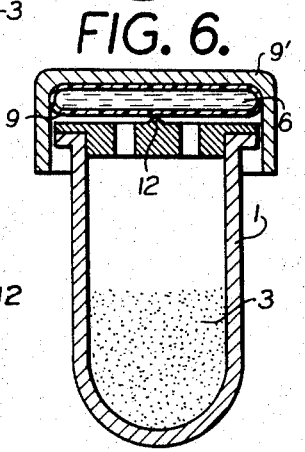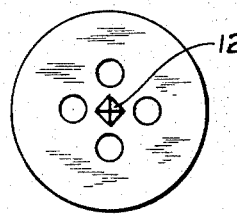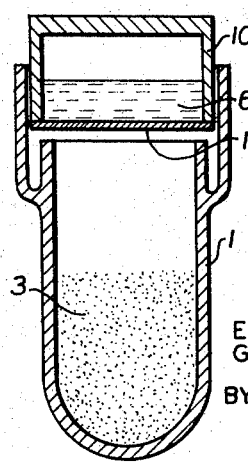

3,415,360
RECEPTACLE FOR DENTAL PREPARATIONS
Erwin Baumann, Nendeln, and Garhard Beham, Vaduz, Liechtenstein, assignors to Etablissement Dentaire Ivoclar, Schaan, Germany
Continuation-in-part of application Ser. No. 471,986, July 14, 1965. This application Dec. 19, 1966, Ser. No. 602,754
12 Claims. (Cl. 206—47)

ABSTRACT OF THE DISCLOSURE

A package for dental preparations comprising two telescoping members each open at one end and closed at the other end, one of the members having a separating means having an opening therein positioned in the open end thereof and a pouch positioned thereon between the separating means and the closed end wall of the other member, whereby upon telescoping of the two members together rupture of the pouch results in expelling of the contents therefrom, through the opening in the separating means and into the other member for mixing.

---

This application is a continuation-in-part of our patent application filed in the name of Erwin Baumann and Gehard Beham under Ser. No. 471,986 on July 14, 1965, now abandoned.

It has been known that certain preparations used in dentistry consist of two or more ingredients which have to be kept in storage separately from each other and have to be mixed manually in predetermined proportions just before use in order to form mixtures which are then used as dental fillings, cements, amalgams, calcium hydroxide preparations, self-hardening dental plastics and any other mixed preparations of dentistry, or the like. It was contemplated by such mixing that the individual ingredients enter chemical reactions, due to which they can assume a final consistency.

However, it has been also known that this kind of procedure is not satisfactory, because it is difficult to obtain by manual mixing mixtures which are uniform to the desired extent and contain the respective ingredients exactly in the prescribed proportions. For these reasons it has been suggested previously to provide capsules or the like in which the ingredients to be mixed are placed initially in spaces separated from each other and in which the separating means can be destroyed or removed just before use in dental practice, so that subsequently the various ingredients can be mixed. However, the suggestions of this type known from the prior art had various disadvantages and, therefore, did not come in use in dental practice.

The main object of the present invention is the provision of receptacles which have several compartments, in which several ingredients may be separately stored in the desired exactly predosed quantities.

Another object of the invention consists in the provision of a receptacle, in which the separately stored ingredients may be mixed, substantially homogenously, with each other by subjecting the receptacle to shaking, tumbling, or the like, without exposing the ingredients to contact with air, humidity, dust, or the like.

Still another object of this invention is to provide receptacles for dental materials which can be easily transported and carried and which will enable them to be stored without change and to be made ready for instant use without deterioration.

Other objects and the advantages of the invention will become apparent from the more detailed description of the receptacles embodying the invention and from the appended drawings which illustrate by way of example some embodiments of the invention.

In the drawings,

FIGURE 1 diagrammatically illustrates a preferred embodiment of the invention;

FIGURES 2–4 diagrammatically illustrate somewhat modified embodiments of the receptacle according to the invention, and FIGURE 5 is a perspective view of the receptacle shown in FIGURE 1;

FIGURES 6–9 are similar illustrations of somewhat modified receptacles according to the invention.

Referring now to the drawings in detail, in FIG. 1 reference numeral 1 denotes a cylindrical container part closed at its bottom and open at its opposite end. Said cylindrical container 1, which is of circular cross-section, serves for receiving a pulverulent ingredient 3. A circular flange 8' of a circular plug 8 rests on the circular upper edge 1' of cylindrical part 1 and said plug has in its center an opening 8". The upper surface of plug 8 has a slight incline from its periphery toward its central opening 8". The edge of the open upper end of cylindrical part 1 is slightly inward beveled at 1' in order to provide a satisfactory seat for plug 8. On the upper surface of plug 8 a sealed cushion-like plastic pouch 9, filled with liquid 6 is placed between plug 8 and top 11 of cap 10, which telescopically engages the outer cylindrical surface of member 1. If desired, a disc 12 of rubber or similar material may be placed between the upper surface of pouch 9 and the inner surface 13 of top 11, and said inner surface may have a slight convex curvature, as shown in FIG. 1. Upon pressing cap 10 downward in the drawing, pouch 9 is ruptured and from the pouch the liquid 6 flows through opening 8" into member 1, which contains the pulverulent material. Said rubber disc facilitates complete emptying of the pouch 9, upon applying pressure to cap 10.

FIGURES 2–4 illustrate slightly modified embodiments of the invention shown in FIG. 1 in which identical reference numerals have the same, or similar, meaning as in FIGURE 1.

In FIGURE 2, the inner surface 13 of top 11 does not have said slightly convex curvature and in FIGURE 3 the upper surface of plug 8 does not have the slight incline from the periphery to the center. In FIGURE 4, the rubber disc 12 has one surface of slightly convex curvature.

In FIGURE 6, 1 denotes a cylindrical member which serves for receiving the pulverulent ingredient 3. An insert resting on the upper edge of cylindrical member 1, has—preferably in its center—a conical or prism-shaped mandrel 12, directed toward the cushion-shaped pouch 9. On the base of the insert there are several bores, best shown in FIG. 6A, to permit liquid 6 to flow downward upon rupture of the pouch 9. Upon pressing cap 9' toward member 1, the pouch is ruptured and the liquid 6 flows downward into member 1, which contains the pulverulent ingredient 3.

In FIGURE 7 the receptacle has a cylindrical member 1 for receiving the pulverulent material and a cap 10 of the design shown in this figure. This cap is bowl-shaped and the liquid component is filled into the cavity of the cap and sealed therein by means of a foil 15. An insert 16, which is placed and fits tightly into cylinder 1, is provided in its center with a bore. Upon pressing cap 10 and cylinder 1 toward each other, rupture of the foil 15 is caused and the liquid component flows into member 1.

In the receptacle shown in FIG. 8, the liquid component is sealed in a ring-shaped container 17 of plastic material. The upper edge of the cylindrical receptacle member 1 is reinforced to such extent that it serves as support for member 17. If parts 1 and 10 are pressed toward each other, member 17 is ruptured and the liquid component flows into member 1.

In FIG. 9, cylindrical member 1 is partially double-walled and member 10 can be introduced into member 1, as shown. Said member 10 is closed on one of its end surfaces only, before liquid is introduced into it. After filling in the liquid component, the other end of member 10 is sealed with a foil 15 and is then inserted into member 1 as shown in the drawing. Upon vigorously pressing parts 1 and 10 toward each other, the foil 15 is ruptured and the liquid flows into and mixes with the pulverulent material in member 1.

The elements of the receptacles described herein can be made of any suitable material which is sufficiently rigid or firm under ordinary atmospheric conditions at room temperature, to permit handling the receptacle after rupture of the pouch in a mixing or tumbling device of the like, without deformation of the shape of the receptacle. Such materials are, for example, thermosetting or thermoplastic plastics, e.g. polystyrene, polypropylene and the like, which are preferred, but also metals. The sealed plastic pouch is preferably made of thin layers or foils which are capable of heat sealing and are substantially impermeable to impurities, steam or gases. It has been found to be of advantage to prepare the pouch for liquids of a base member capable of being relatively easily ruptured and consisting of composite aluminum-polyethylene sheeting, while the top of the pouch may consist of composite polyethylene-aluminum sheeting, to which a sheeting of cellophane is fastened by an adhesive.

As described above, rupture of the pouch, or the like, can be effected by moving the upper and lower member of the receptacle toward each other. This can be done either manually or by a simple device, in which such movement of the two members is brought about by moving a lever.

Part of the outer surface of the first member and part of the outer surface of the second member of the receptacle may be knurled, as shown in FIGURE 5.

After entrance of the liquid component into the receptacle member containing the solid ingredient, the receptacle disclosed above permits the obtaining of a homogeneous mix, which may be paste-like, for example by placing said receptacle in a mechanically operated shaking mechanism or device, in which the receptacle is subjected to a high number of fast shaking motions per minute.

What is claimed is:

1. A receptacle for storing and mixing a preparation consisting of at least one liquid and one pulverulent solid ingredient which have to be maintained separate until they are admixed shortly before using the preparation, said receptacle comprising first and second substantially rigid, hollow members arranged in connected end to end relationship to define an elongated shaped close receptacle, one of said members having a tubular side wall, a closed end and an open end, said member being adapted to house the pulverulent solid ingredient which is inserted therein through the open end, the other of said members having a tubular side wall complemental to and connected at one of its ends with the tubular side wall of the one member at the open end of the one member and the other of said members having its side wall closed off at the other end so that the other of the members defines an enclosure, a frangible pouch of impermeable flexible plastic material sealingly enclosing completely the liquid ingredient and bodily disposed within and encompassingly housed by the other of the members, said pouch having opposing first and second faces disposed transversely of the receptacle, means of a rigid material nature fixedly disposed at and surrounding at least a part of the open end of the one member and arranged normal to the longitudinal axis of said member and defining a first rigid pressure surface, said pouch being freely seated at its first face on said first rigid pressure surface, said means defining said first rigid pressure surface being provided with passage means arranged therethrough in longitudinal direction relative to the one member and providing a flow passage for the liquid in the pouch, when the liquid is released from the pouch, into the interior of the one member, and means of a rigid material nature carried by the other of the members and disposed normal to the longitudinal axis of the receptacle and defining a second rigid pressure surface which is disposed in facing position with respect to the second face of the pouch, said pressure surfaces lying in parallel planes, and means for moving the first and second rigid pressure surfaces relative towards each other and into compressing engagement of the opposite faces of the pouch so as to initially produce a rupture of the pouch and then to effect, upon further relative movement of the rigid pressure surfaces toward each other, forcefully complete expulsion of substantially all the liquid from the pouch and forced passage thereof into the interior of the one member where it can be admixed with the pulverulent ingredient already contained therein so that the ingredients become mixed exactly in the desired proportion.

2. The invention of claim 1 wherein said means defining the second rigid pressure surface includes a closed end wall on the other member and said means for moving the pressure surfaces compressingly relative to each other comprises a telescopic slidable interfitting engagement between the side walls of the two members.

3. The invention of claim 1 wherein said means defining the first rigid pressure surface includes a rigid apertured disc seated on and overlying the open end of the first member.

4. A receptacle for storing and mixing a preparation consisting of at least one liquid and one pulverulent solid ingredient which have to be maintained separate until they are admixed shortly before using the preparation, said receptacle comprising first and second telescopically arranged, substantially rigid members, one of said members having a tubular side wall, a closed end and open end, said member being adapted to house the pulverulent solid ingredient which is inserted therein through the open end, the other of said members being cup-shaped an having a side wall slidable on the side wall of the one member and having an end wall transversely confronting the open end of the one member, a substantially rigid, apertured disc seated on and overlying the open end of the one member, a frangible pouch of impermeable flexible plastic material sealingly enclosing the liquid ingredient and bodily interposed between the disc and the end wall of the other member and seated on the disc, said end wall of the other member being of an effective cross-sectional moving pressure area substantially equal to the effective cross-sectional stationary pressure area of the disc with which it is in complemental pressing relationship in acting on the pouch interposed therebetween and the said end wall, as the members are moved axially together, and the disc lying in parallel planes normal to the longitudinal axes of the side walls of the members, so that the pressing interaction of the rigid moveable end wall and the stationary, rigid disc on the pouch produces a rupture of the pouch and a consequent expulsion of all of the liquid ingredient into the one member where it can be admixed with the pulverulent ingredient already contained therein, whereby the ingredients become mixed exactly in the desired proportion.

5. The invention of claim 4 wherein means is provided for removably and sealingly seating the disc on the open end of the one member.

6. The invention of claim 5 wherein said last means includes said disc having a body portion frictionally fitted in the open end and having a peripheral flange overlying the end of the side wall at the open end.

7. The invention of claim 6 wherein said disc has a central perforation.

8. The invention of claim 4 wherein a resilient disc is interposed between the pouch and the end wall of the other member and is of a cross-sectional area equal to the effective pressure area of said end wall.

9. The invention of claim 8 wherein the resilient disc has a convex face touching the pouch and the stationary rigid disc has a concave face touching the pouch.

10. The invention of claim 8 wherein the facing surfaces of the end wall of the other member and the rigid, stationary disc are of complemental concave-convex formation.

11. The invention of claim 4 wherein the pouch is formed from impermeable plastic and has a thin easily rupturable wall seated on the rigid disc and a more rigid, more pressure-resistant wall facing the end wall of the other member.

12. The invention of claim 4 wherein the outer surface of the side wall of at least one of the members is at least partially knurled.

References Cited

UNITED STATES PATENTS

| | | | |
|---|---|---|---|
| 710,060 | 9/1902 | Kann | 206—42 |
| 1,774,258 | 8/1930 | English | 206—47 |
| 2,487,236 | 11/1949 | Greenberg | 206—74 |
| 2,527,992 | 10/1950 | Greenberg | 206—47 |
| 3,139,180 | 6/1964 | Kobernick | 206—47 |

FOREIGN PATENTS

| | | |
|---|---|---|
| 1,261,684 | 4/1961 | France. |

WILLIAM T. DIXSON, JR., *Primary Examiner.*

UNITED STATES PATENT OFFICE
CERTIFICATE OF CORRECTION

Patent No. 3,415,360                                        December 10, 1968

Erwin Baumann et al

It is certified that error appears in the above identified patent and that said Letters Patent are hereby corrected as shown below:

In the heading to the printed specification, line 5, "Germany" should read -- Liechtenstein --.

Signed and sealed this 10th day of March 1970.

(SEAL)
Attest:

Edward M. Fletcher, Jr.                          WILLIAM E. SCHUYLER, JR.
Attesting Officer                                       Commissioner of Patents